July 9, 1946.  R. HAYWARD  2,403,660
OPTICAL SYSTEM FOR CAMERAS
Filed May 29, 1945  3 Sheets-Sheet 2

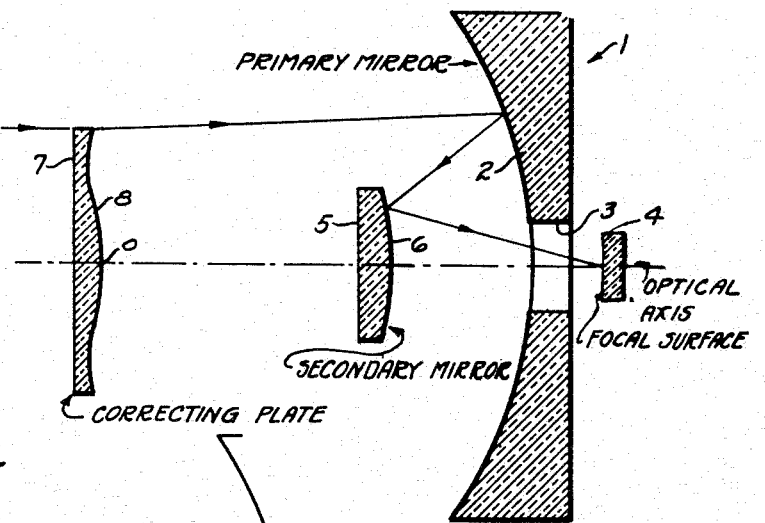
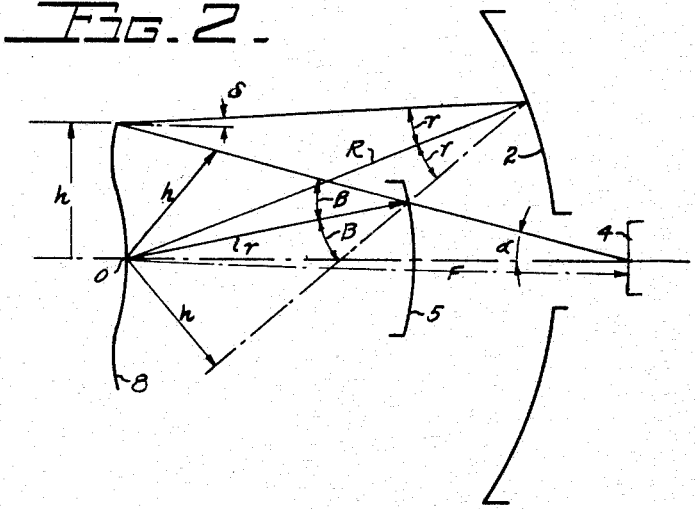
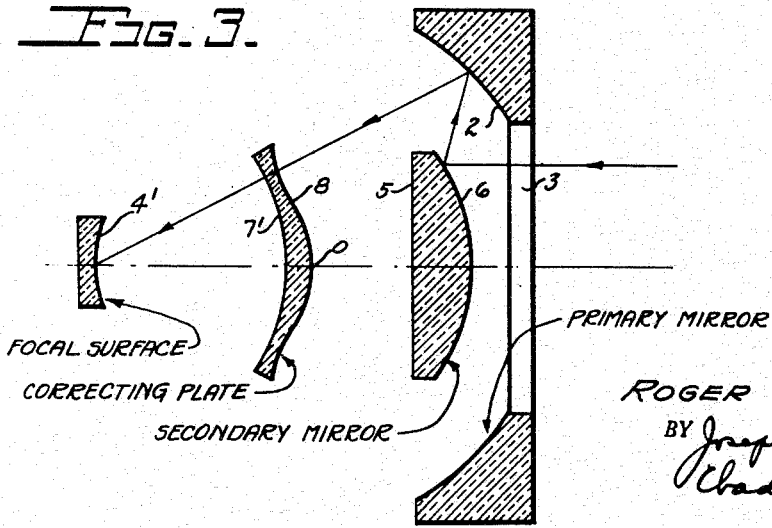

INVENTOR.
ROGER HAYWARD
BY
ATTORNEYS

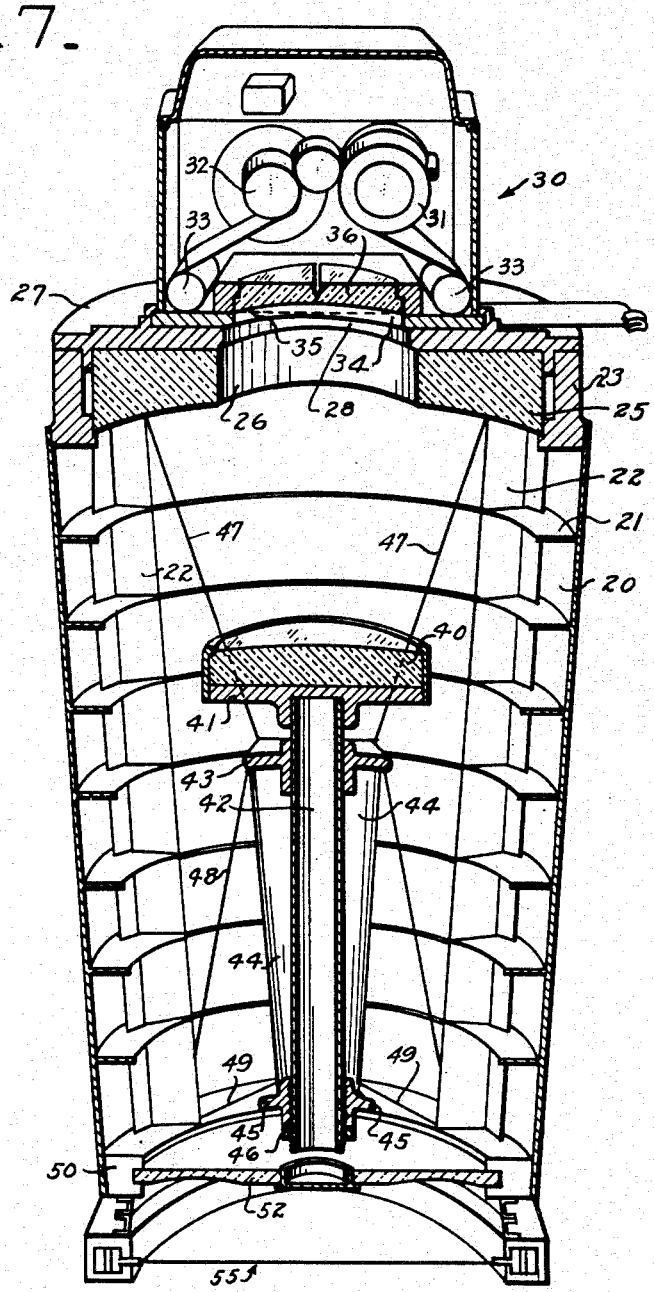

Patented July 9, 1946

2,403,660

UNITED STATES PATENT OFFICE 2,403,660

OPTICAL SYSTEM FOR CAMERAS

Roger Hayward, Pasadena, Calif.

Application May 29, 1945, Serial No. 596,459

6 Claims. (Cl. 88—57)

The invention described herein may be manufactured and used by or for Government for governmental purposes, without the payment to me of any royalty thereon.

The present invention relates to improvements in optical systems for cameras and more particularly to the provision of means for the practical utilization of the Schmidt astronomical camera principle in aerial photography.

The Schmidt camera, in order to overcome the defects of refracting lens systems, employs a single spherical reflecting mirror to focus an image of an object to be photographed, light transmitted to the mirror passing through a thin correcting plate or lens which introduces correcting aberrations in the incident light beams exactly compensating for the spherical aberration of the mirror. The Schmidt optical system gives images practically free from defects such as spherical aberration, coma, astigmatism, and chromatic aberration except for the chromatic errors introduced by the thin correcting plate. The Schmidt camera in its usual form requires the correcting plate, or mirror as the case may be, to be positioned at a distance of approximately twice the focal length in front of the mirror and further requires the photographic plate to be placed between the mirror and correcting plate, which features render such a camera wholly impractical for use in aerial photography.

In accordance with the present invention the remarkable properties of the Schmidt optical system are utilized for aerial camera construction by employing primary and secondary spherical mirrors, preferably having a common center of curvature with the correcting plate of the refracting type placed at the common center of curvature of the mirrors. The primary mirror is concave and provided with a central aperture which permits the incident light reflected from the primary mirror to be again reflected by the convex secondary mirror and to pass through the aperture forming an image on a spherical focal surface. This arrangement may be optically reversed, i. e., the light may be received through the primary mirror aperture and finally received on a focal surface placed immediately behind the correcting plate. The primary and secondary mirrors and the focal surface can be made of one piece of glass where the focal length of the camera permits. The reversed optical system also permits the use of a reflecting type correcting plate placed at the center of curvature of the primary and secondary mirrors with the focal surface placed between the correcting plate and the secondary mirror, but such an arrangement would be impractical for aerial camera construction due to inaccessibility of the film.

The construction in accordance with the invention permits the film to be placed at the end of the camera for accessibility and reduces the over-all length of the camera by one-half as compared to an equivalent Schmidt camera. In accordance with the invention a single correction plate is employed which corrects the aberrations produced by the reflection from both primary and secondary mirrors. With an arrangement as described the shape of the correction plate is such that it is much less difficult to figure than the correcting plate employed in the conventional Schmidt construction. While the use of a secondary mirror cuts down the amount of incident light received on the primary mirror, a camera in accordance with the invention still will produce a better result with respect to optical definition and speed than can be obtained with a conventional refracting optical system.

Therefore the principal object of the invention is the provision of means for utilizing the Schmidt camera principle in a form enabling the same to be used in aerial photography.

It is a further object to provide an improved Schmidt type camera employing two spherical reflectors with a single correcting plate and with a focal surface so positioned that the film holder is readily accessible.

It is another object of the invention to provide an improved camera optical system of the Schmidt type employing two mirrors, one a primary concave spherical mirror and the other a convex spherical mirror, both positioned to have a common center of curvature, and a single reflecting or refracting correction plate being positioned at or adjacent the center of curvature of the mirrors, the radius of curvature of the secondary mirror being approximately two thirds the radius of the primary mirror.

It is a further object of the invention to provide in a two-mirror camera optical system of the character described a construction whereby both mirrors and a spherical focal surface may be formed in a single piece of glass.

Other objects and features of the invention will appear by reference to the detailed description hereinafter given and to the appended drawings in which:

Fig. 1 is a diagrammatic sketch illustrating one form of improved optical system in accordance with the invention;

Fig. 2 is a view similar to Fig. 1 but illustrating the geometrical relationship of the various parts;

Fig. 3 is a view illustrating a reversed optical arrangement of the form of the invention of Fig. 1;

Fig. 7 is an isometric cut-away view illustrating an aerial camera employing the optical system of Fig. 1.

Figure 4:
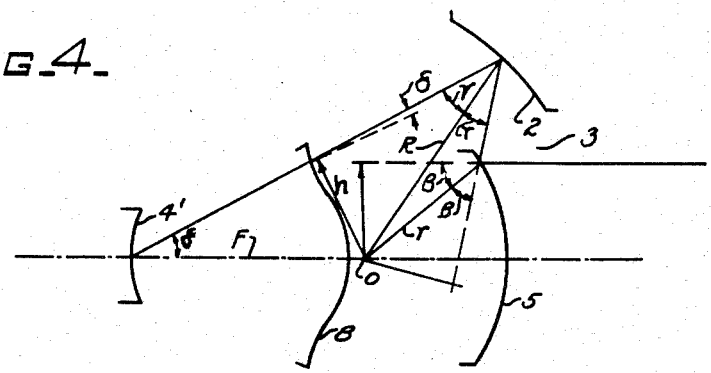
Fig. 4 is a view similar to Fig. 3 but illustrating the geometrical relationship of the various parts.

Referring now to Fig. 1, the camera optical system in accordance with the invention includes a primary concave spherical mirror 1 having the concave surface 2 thereof silvered or aluminized to form a reflecting surface. The mirror 1 is provided with a central aperture 3 similar to that provided in a Cassegranian telescope and through which light is transmitted to a spherical focal surface 4 which is in such a position that a conventional roll film or cut film holder may be employed in conjunction therewith. A secondary mirror 5, of considerably less diameter than the primary mirror, has a convex spherical reflecting surface 6 positioned in front of the primary mirror concentric with the optical axis thereof. The mirrors 1 and 5 and focal surface 4 have a common center of curvature 0 on the optical axis and at which point a refracting correcting plate 7 is positioned and having a correcting surface 8 formed on the rear face thereof.

Light transmitted from the object being photographed passes through the correcting plate 7, which introduces aberrations into the light rays exactly equal and opposite the aberrations introduced by the mirrors 1 and 5. The light passing through the correcting plate first impinges on the reflecting surface 2 and is reflected onto the convex mirror surface 6 and finally focused on the focal surface 4, which is positioned as close to the plane of the primary mirror as practicable.

The camera optical system of Fig. 1 requires that the radius of the convex spherical mirror be made approximately two thirds the radius of the primary spherical mirror and that both mirrors have a common center of curvature. It is desirable, as will be later described, that the radius of the primary mirror be made nearly equal to the focal length of the mirror combination and that the diameter of the secondary mirror not exceed two thirds the diameter of the primary mirror.

For a general consideration of the geometrical properties of a camera optical system in accordance with the invention reference may be had to Fig. 2. In this figure the radius of the primary mirror is indicated by the symbol $R$, the radius of the secondary mirror by $r$ and the radius of the spherical focal surface by $F$. The distance from the optical axis of any point on the correcting plate is indicated by the symbol $h$ and $\delta$ indicates the deviation of a ray of light passing through $h$. The angles of incidence of the light are:

On the primary mirror $\gamma$
On the secondary mirror $\beta$
On the focal surface $\alpha$
And $n$ = index of refraction of the correcting plate.

With the above notation a ray tracing method of obtaining the slope of the curve of the correcting plate is given in parametric form by $$\sin \alpha = \frac{h}{F}$$

$$\sin \beta = \frac{h}{r}$$

$$\sin \gamma = \frac{h \cos \delta}{R}$$

$$\delta = \alpha + 2(\gamma - \beta)$$

$$\tan \delta = \left(\frac{n}{\cos \delta} - 1\right)\frac{dz}{dr}$$

Since $$\cos \delta = 1 - \frac{\delta^2}{2}$$

is practically equal to 1, these equations may be used successively to determine the slope, $$\frac{dz}{dr}$$

of the correcting plate at any point for any set of the parameters $F$, $r$, $R$ and $h$. The neutral zone at radius $h_0$ on the plate corresponds to the condition $\delta = 0$ or $\alpha = 2(\beta - \gamma)$.

The analytic expression for the figure of the correcting plate where $D$ is the height or depth of the correcting curve at radius $h$ relative to the level at the neutral zone at radius $h_0$, the terms of the sixth order is given by:

$$D = \frac{1}{4(n-1)R_3}\left[A(\eta^2 - \eta_0^2)^2 + \frac{B}{R_2}(\eta^2 - \eta_0^2)^3 + h\right]$$

where $A$ and $B$ are constants involving $R$, $r$, and $F$ and:

$$A = \frac{1}{1 - 2\frac{\eta_0^2}{R^2}}\left[\frac{1}{\sqrt{1-\frac{\eta_0^2}{R^2}}} + \frac{2R^3}{Fr^3} - \frac{R^3}{r^3}\left(\frac{r^2}{F^2}\right)\frac{\sqrt{1-\frac{\eta_0^2}{R^2}}}{1-\frac{\eta_0^2}{F^2}} + \frac{\sqrt{1-\frac{\eta_0^2}{F^2}}}{1-\frac{\eta_0^2}{r^2}}\right]$$

$$B = \left[\frac{3}{2} + \frac{8R^3}{3Fr^2} - \frac{4R^3}{3r^3}\left(1+\frac{r^2}{F^2}\right) - \frac{R^5}{6r^5}\left(1-\frac{r^2}{F^2}\right)^2\right]$$

The radius of the focal sphere, $F$ is expressed by the implicit but exact equation $$\frac{r}{R} = \frac{\sqrt{\frac{(1-\eta_0^2)}{F^2}\frac{(1-\eta_0^2)}{r^2}}}{\sqrt{1-\frac{\eta_0^2}{R^2} + \frac{R}{2F}\left(1-2\frac{\eta_0^2}{r^2}\right)}}$$

The form of the correcting plate for the usual one mirror Schmidt construction is derived from the above general expressions for $D$ and $F$ by setting $r = F$ for which case the coefficients $A = 1$ and $B = 3/2$.

The case of interest with respect to the present invention is the two mirror instrument where the radius of the primary mirror is equal to the focal length. This may be obtained from the general expressions by introducing $R = F$ therein and where $R$ is not quite equal to $F$ to write $F = fR$ and subsequently to take advantage of the fact that $f$ is close to unity. This process leads to results so close to the case where $R = F$ that it will not be considered further.

In the general expression for the ratio $r/R$ for present purpose $h^2_0/r^2$ is a small quantity and it is permissible to expand in terms of $h^2_0$. The term of order zero is much the larger and this term alone is sufficient for an approximate value of $r/R$ and reduces when $F = R$ to $r/R = 2/3$ and closer approximation may be made by substituting this value in the general expression for $r/R$ and the process continued.

When $r/R=2/3$ is substituted in the general expressions for A and B the general expressions are no longer formidable. The constant B which is part of a small term can be roughly approximated and reduces to a value of 5/8 with sufficient approximation. The expression for A contains only terms of the character of $$\frac{\eta_0^2}{R^2}$$

It is sufficient for a qualitative discussion of the two-mirror camera having a focal length close to the radius of the primary mirror to substitute in the expressions for A and B the approximate values $F/R=1$; $r/R=2/3$ and $h_0/R=0$. Then the expression for D reduces to:

$$D=\frac{5}{32(n-1)R^3}\left[(\eta^2-\eta_0^2)^2+\frac{1}{R^2}(\eta^2-\eta_0^2)^3\right]$$

The second term may be neglected and the resulting expression for D shows that the depths of the correcting plate curve are one half those required for an ordinary Schmidt camera having the same primary mirror, which greatly simplifies the manufacture of the correcting plate.

The angular field to be covered and the focal ratio determine the diameter of the correcting plate for which a suitable primary mirror diameter may be determined. The diameter of the secondary mirror is determined primarily by the size of image and the necessity for minimum obstruction to light, the limiting diameter being two thirds that of the primary mirror.

For shorter focal lengths the difference in radii between the primary and secondary mirrors is such that the mirror surfaces as well as the focal surface may be formed on a single piece of glass which greatly simplifies manufacture.

The optical system of Fig. 1 may be reversed in the manner illustrated in Fig. 3 in which the only difference is the placing of the focal surface 4' to the rear of the correcting plate 7'. The parts of the optical system are identical with Fig. 1 and function in the same manner except that light from the object being photographed first passes through the aperture 3, is then reflected from mirror surfaces 6 and 2 and refracted by correction plate 7' before forming an image on the focal surface 4'.

For a general consideration of the geometrical properties of the camera optical system of Fig. 3 reference may be had to Fig. 4. The same theory that was explained above for Fig. 2 may also be used to analyze this system.

Figure 5:
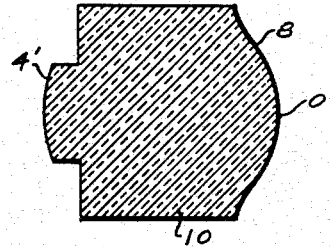
Fig. 5 is a schematic view illustrating a novel focal surface and correcting plate construction formed in a single piece of glass.

Fig. 5 illustrates a focal surface 4' and a correcting surface 8 formed in a single piece of glass 10. This construction may be substituted for the separate focal surface 4' and correcting plate 8 illustrated in Fig. 3. The effective focal length of this construction is $F/n$ where $n$ is the index of refraction.

By forming the primary mirror and the secondary from a single piece of glass as explained hereinbefore and using the construction illustrated in Fig. 5, it is entirely reasonable to construct a Schmidt type camera optical system consisting of only two pieces of glass.

The foregoing discussion and the drawings are based on the assumption that the focal plane (the object) is at substantial infinity. The ratio $r/R=2/3$ applies to that case. If the system be designed with the focal plane at a relatively short distance the ratio $r/R$ will approach 1/2 as the object distance and the internal focal distance in the system approach equality.

Figure 6:
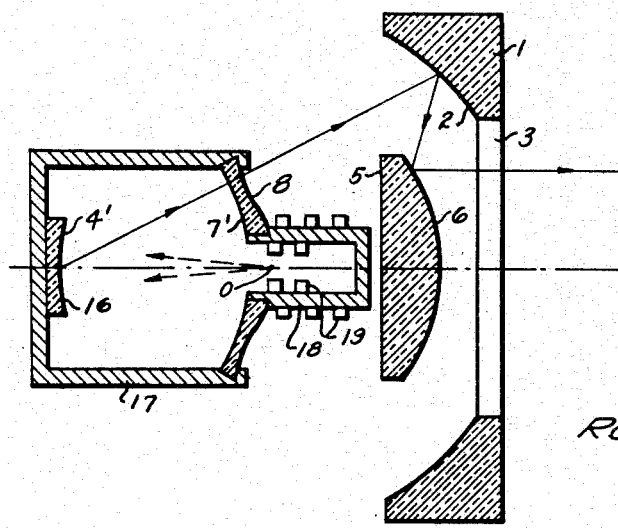
Fig. 6 is a view illustrating a television projector employing the optical system of Fig. 3.

Fig. 6 illustrates a television projector utilizing the optical system of Fig. 3. The projector comprises a vacuum chamber defined by a casing 17 connected by the refracting correcting plate 7' to another casing 18. The casing 18 has means 19 associated therewith for projecting and focusing electrons onto a fluorescent surface 16, located on the rear end of the casing 17, to produce a visible image on the surface 16. Light is transmitted from the surface 16 through the refracting correcting plate 7' and impinges on the reflecting surface 2 and is reflected onto the convex mirror surface 6 and is finally focused on a focal surface. It will be realized that this optical system may also be readily adapted for use in a television receiver.

Fig. 7 illustrates an aerial camera construction utilizing the optical system of Fig. 1. The camera comprises a thin metal casing 20 in the form of a truncated cone stiffened by internal annular rings 21 and longitudinally extending ribs 22.

The casing 20 is provided at its upper end with an annular ring 23 which serves as a support for the silvered glass spherical primary mirror 25 which is provided with a central aperture 26. A cover plate 27 bolted to the ring 23 retains the mirror in assembled relation and is provided with a central aperture 28 which registers with the aperture in the primary mirror.

The cover plate 27 serves as a support for a conventional removable aerial camera roll film magazine 30 having a supply spool 31, a take-up spool 32 and film guide rolls 33. The roll film is adapted to traverse an aperture 34 in the magazine casing in register with the aperture 26 in the primary mirror, the film spools being intermittently actuated by electrical power means not shown to position the film. The film is adapted to contact a concave spherical focal surface 35 formed in a glass disc 36 which is suitably mounted in the film magazine. The film may be sprung into contact with the focal surface by means of suction or by means of curved guides not shown.

A convex spherical secondary mirror 40 is mounted in a holder 41 which in turn is secured to the upper end of a tubular member 42 slidably supported adjacent its upper end in a guide 43 which is rigidly connected by longitudinal ribs 44 to a threaded boss 45 into which the threaded lower end of the tubular member 42 is secured and held in fixed axial adjustment by a locknut 46. Thin brace wires, such as indicated at 47, 48 and 49, connected to the longitudinal casing ribs 22 hold the secondary mirror assembly fixed with respect to the camera casing and optical axis.

At its lower end the camera casing 20 is provided with a circular ring 50 which serves as a mounting for a circular refracting type correcting plate or lens 52 and the ring also serving as a support for a conventional shutter mechanism generally indicated by the reference numeral 55.

The principal optical data for a camera built in accordance with the construction of Fig. 5 is as follows:

Focal length=30''
Radius of curvature primary mirror=27.5''
Diameter of primary mirror=16''
Radius of curvature of secondary mirror=19''
Diameter of secondary mirror=7.5''
Diameter of correcting plate=12''
Angular field=10°

It will be apparent to those skilled in the art that variations may be made in the structure shown without departing from the spirit of the invention as defined in the appended claims.

I claim:

1. An improved Schmidt type camera optical system comprising a concave spherical primary mirror having a light transmitting aperture therein, a convex spherical secondary mirror positioned on a common optical axis with the primary mirror, said mirrors having a common center of curvature, the radius of curvature of the secondary mirror being between substantially two thirds and one half the radius of curvature of the primary mirror, the focal length of the combination of mirrors being substantially equal to the radius of curvature of the primary mirror, a single correcting lens positioned at the center of curvature of said mirrors and introducing correcting aberrations in the light passing therethrough equal and opposite to the total of the aberrations produced by said mirrors and a spherical focal surface for receiving an image reflected by said mirrors, said focal surface having a radius of curvature substantially equal to the combined focal length of said primary and secondary mirrors.

2. The structure as claimed in claim 4, in which the focal surface is positioned concentric with the aperture in said primary mirror whereby light reflected from the secondary mirror passes through the said primary mirror aperture to form an image on said focal surface.

3. The structure as claimed in claim 4, in which the focal surface is positioned behind the correcting lens, light passing from the object being photographed through said primary mirror being reflected from said secondary to said primary mirror prior to refraction by said correcting lens.

4. An improved Schmidt type camera optical system comprising a concave spherical primary mirror having a light transmitting aperture therein, a convex spherical secondary mirror positioned on a common optical axis with the primary mirror, said mirrors having a common center of curvature, the radius of curvature of the secondary mirror being substantially equal to two thirds the radius of curvature of the primary mirror, the focal length of the combination of mirrors being substantially equal to the radius of curvature of the primary mirror, a single thin correcting lens positioned at the center of curvature of said mirrors and introducing correcting aberrations in the light passing therethrough equal and opposite to the total of the aberrations produced by said mirrors and a spherical focal surface for receiving an image reflected by said mirrors, said focal surface having a radius of curvature substantially equal to the combined focal length of said primary and secondary mirrors.

5. The optical system as claimed in claim 4 in which the correcting lens and focal surface are formed on a single piece of glass.

6. The optical system as claimed in claim 4, in which the focal surface is positioned at that side of the correcting lens which is opposite the primary and secondary mirrors, said correcting lens and said focal surface being formed as opposite surfaces of a single piece of glass.

ROGER HAYWARD.